Patented Jan. 8, 1946

2,392,376

UNITED STATES PATENT OFFICE 2,392,376

BLACK PRINTING INKS

Werner F. Goepfert, Oradell, N. J., assignor to Interchemical Corporation, New York, N. Y., a corporation of Ohio No Drawing. Application May 15, 1942, Serial No. 443,128

5 Claims. (Cl. 106—23)

This invention relates to black printing inks.

In the preparation of black printing inks, which contain colloidally-dispersed carbon, it is customary to add a dark toner to give the ink the desired shade or tone. The most common toners for this purpose are derived from the bases of deep blue to purple basic dyes, such as Victoria Blue and especially Methyl Violet. Other bases which have been employed, particularly in news inks, are those of Induline Blue and Nigrosine Black.

These basic dye bases must be combined with an acid radical to develop the full color strength of a dye. If acid radicals of higher fatty acids are employed, the resulting dyes become oil soluble. For this purpose oleic acid has been used. However, the use of oleic acid as the acid medium has not been entirely satisfactory because of the excessive amount of creeping and penetration of the dye addition product into the paper. This usually becomes apparent as a discoloration or halo around the spot where the ink has been deposited. Also, the strength of the ink is reduced by the creeping of the dye. For many typographic inks the dyestuffs are still used in pigment form to avoid any peneration or creeping.

Stearic acid has been suggested as a substitute for the oleic acid for reaction with the dye base, but stearic acid toners are too crystalline in nature, and inks containing them show a bloom on printing which is easily rubbed off.

This invention provides printing inks of all types which are characterized by their relatively high strength and permanently clear printing. At the same time they do not produce a bloom on printing which can be rubbed off nor do they penetrate through the paper or other porous surface on which they are deposited.

The inks of this invention are prepared by incorporating therein certain toners which are made by reacting one or more dye bases with a fatty acid, or mixture of acids, selected from the group consisting of lauric, myristic and palmitic acids.

The lauric, myristic and palmitic acid toners are unique in that they impart to the inks the characteristics of non-penetration into porous material on which the inks are placed, without the formation of a bloom. Of these the myristic acid toners are preferred because they impart the best balance of non-penetration and printing qualities to the inks. For the usual news ink, where low cost is more important than the finest printing quality, a mixture of lauric and myristic acids in which Induline Blue base is dissolved provides an excellent toner. For the best inks the toner formed by reacting Methyl Violet (or a mixture of dyes containing predominantly Methyl Violet) with myristic acid or a mixture of fatty acids largely composed of myristic acid, is one of the most satisfactory. Combinations of Induline and Methyl Violet toners may be used.

The preparation of these inks is illustrated in the following examples:

Example 1.—Methyl Violet myristic acid toner 91.2 parts by weight of myristic acid were heated to about 85° C., and 50 parts by weight of Methyl Violet base were added slowly with agitation. Upon complete addition of the dye base, the temperature was raised to 100° C., and maintained for fifteen minutes, after which the material was allowed to cool. The toner formed had a bronze-purple color and possessed a relatively high viscosity, and it is believed to be an addition product of the dye base and acid similar to an ammonium salt. A more wax-like material may be obtained by using substantially more than three moles of myristic acid to one mole of dye base, due to the excess acid present.

Example 2.—News ink

A typical non-penetrating news ink was prepared by milling the toner of Example 1 with carbon black, rosin oil and mineral oil in the following proportions:

| | Per cent |
|---|---|
| Carbon black | 10 to 14 |
| Rosin oil | 1 to 5 |
| Toner from Example 1 | 1½ to 4 |
| Mineral oil | Remainder |

Example 3.—Linseed oil ink

The mineral oil of Example 2 was replaced with linseed oil. The preferred proportions for this type of ink were:

| | Per cent |
|---|---|
| Carbon black | 15 to 20 |
| Rosin oil | 20 to 25 |
| Toner from Example 1 | 1 to 4 |
| Linseed oil | Remainder |

Example 4.—Induline toner

A cheaper news ink toner was made by substituting Induline base for the Methyl Violet base of Example 1, and using a mixture of lauric and myristic acids instead of substantially pure myristic acid. About 4.2 moles of acid to one mole of dye base was used, giving a slight excess of acid over the theoretical amount needed to combine with the dye base. The acid mixture contained about 60% lauric acid, although pure lauric acid may be used if desired. This toner was very dark blue, and did not have quite the coloring power of the Methyl Violet toner. News inks and linseed oil inks were prepared with the Induline toner by substituting the latter directly for the toner in the formulas of Examples 2 and 3.

Example 5.—Nigrosine and Victoria Blue toners

Other printing inks which were characterized by their relative lack of penetration into paper were made by substituting Nigrosine and Victoria Blue bases for the Induline base of Example 4, and using the toners in admixture (in various proportions) in the formulas shown in Examples 2 and 3. In the case of the Nigrosine the mole ratio of base to acid was about 1, and with the Victoria Blue it was about 3 moles of acid to 1 mole of base.

Example 6.—Palmitic acid toners

Another toner was prepared and substituted for the toners used in Examples 2 to 4 by employing 3 moles of palmitic acid in place of the myristic acid of Example 1. This toner was slightly more solid than the myristic acid toner, being a medium hard material which sheared very easily with a knife. Similarly, the palmitic acid may be reacted with Induline base or other dye bases, as indicated in Examples 4 and 5.

Example 7.—Lithographic ink

A lithographic ink was prepared by milling the following materials together. The lithographic varnishes consisted of linseed oil heat bodied to the indicated viscosities, according to standard practice.

|  | Parts by weight |
|---|---|
| Lithographic varnish (11 poises) | 19.4 |
| Lithographic varnish (97 poises) | 42.0 |
| Lithographic varnish (61 poises) | 2.2 |
| Paraffin wax (M. P. 153° F.) | 1.0 |
| Lead manganese drier | 4.3 |
| Toner of Example 1 | 3.1 |
| Carbon black | 28.0 |

Example 8.—Halftone ink

The ink was prepared by milling the following materials together:

|  | Parts by weight |
|---|---|
| Carbon black | 18.0 |
| Linseed varnish (194 poises) | 31.5 |
| Linseed varnish (19 poises) | 44.0 |
| Paraffin wax (M. P. 153° F.) | 1.0 |
| Cobalt drier | 1.8 |
| Wool grease | 1.2 |
| Petrolatum | 1.0 |
| Toner of Example 1 | 1.5 |

If desired, other bodied drying oils may be substituted for the linseed varnish indicated above.

Example 9.—Gravure ink

The following materials were milled together:

|  | Parts by weight |
|---|---|
| Carbon black | 6.0 |
| Toner of Example 1 | 1.0 |
| Zinc resinate | 30.0 |
| Xylol | 12.5 |
| V. M. & P. naphtha | 50.5 |

Example 10.—Printing ink

A printing ink containing resinous materials and designed for fast drying under heat was prepared by milling the following materials together:

|  | Parts by weight |
|---|---|
| Terpene-phenol resin | 33.2 |
| Hydrocarbon solvent (boiling range 245° to 259° C.) | 39.9 |
| Carbon black | 18.9 |
| Toner of Example 1 | 0.5 |

Other dye bases may be employed besides those shown in the examples, and mixtures of them are often desirable in order to obtain particular shades. However, since carbon black naturally has a brownish cast, the blue and violet dyes are the most useful in the preparation of pure black printing inks. Also, black inks having a blue or purple tone appear more pleasing than do those of other tones.

It is obviously not necessary that the acid medium with which the dye base is reacted be pure myristic, lauric or palmitic acid, or a mixture thereof, but it should not contain very large amounts of other acids. Satisfactory news ink toners have been made according to this invention where the acid medium contained as much as about 20% of other fatty acids, but the amount of impurities should preferably be less than this where the toners are to be used in other than news inks.

The Induline and Methyl Violet toners made with palmitic and myristic acids form the subject matter of copending applications Serial No. 443,129, and No. 443,130, filed May 15, 1942, respectively.

I claim:

1. A printing ink containing carbon black, characterized by its lack of bloom and halo on printing, and by the excellent dispersion of the carbon black in the composition, comprising a vehicle from the group consisting of oil, resinous and oleoresinous film-forming compositions, the principal coloring ingredient of which is carbon black, and containing as a toner and dispersing agent therefor the reaction product of a basic dyestuff and at least one fatty acid of the group consisting of lauric, myristic and palmitic acids.

2. The composition of claim 1, in which the dyestuff is methyl violet base.

3. The composition of claim 1, in which the dyestuff is methyl violet base, and the acid is myristic acid.

4. The composition of claim 1, in which the dyestuff is induline base.

5. The composition of claim 1, in which the dyestuff is induline base, and the acid is myristic acid.

WERNER F. GOEPFERT.